United States Patent Office 3,291,424
Patented Dec. 13, 1966

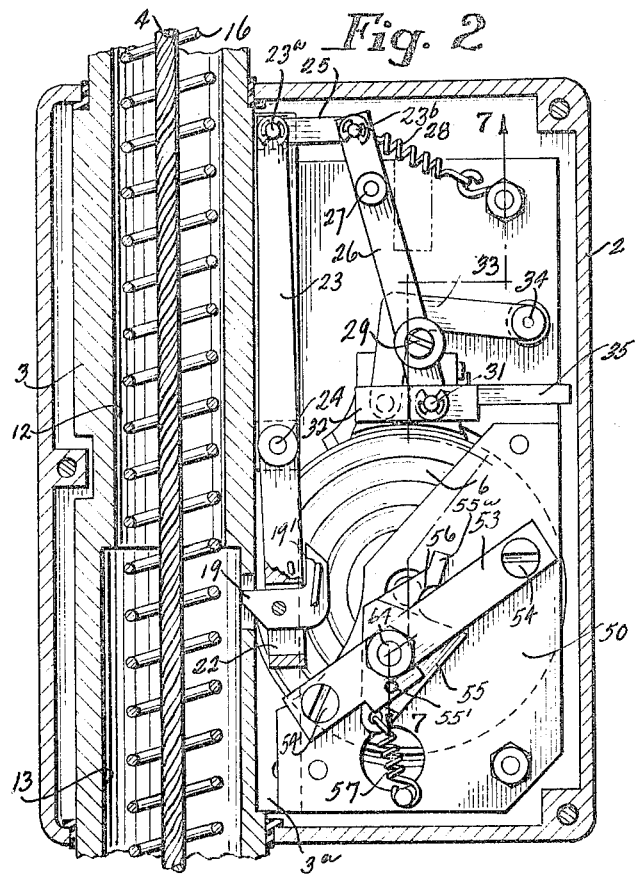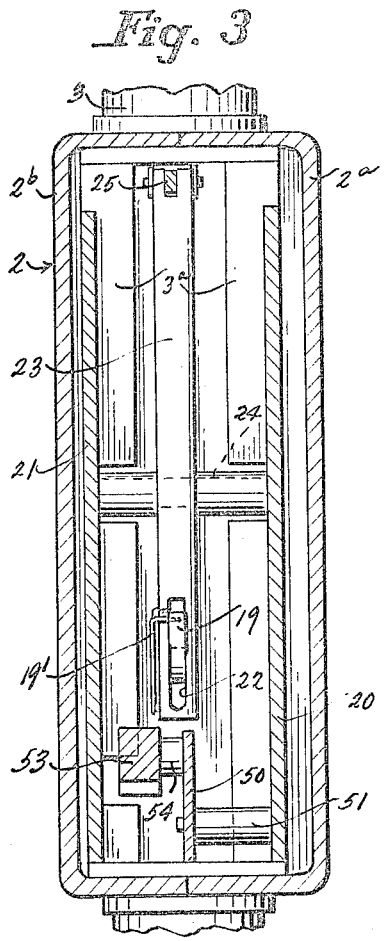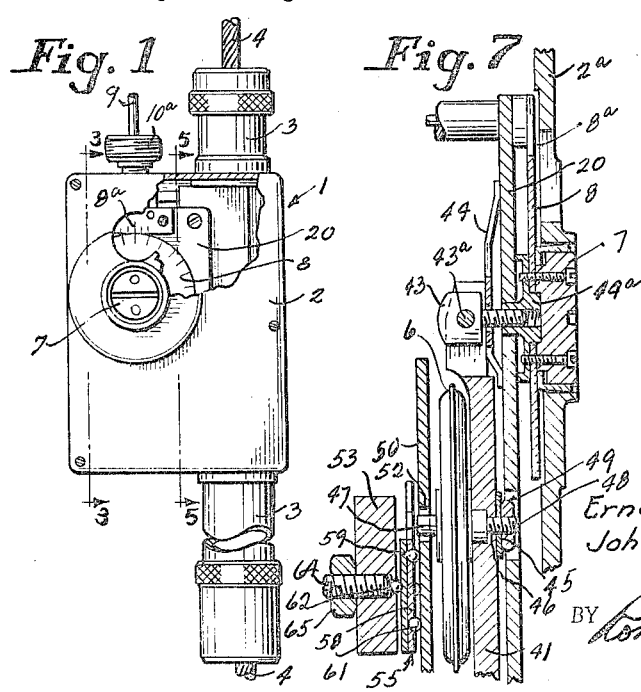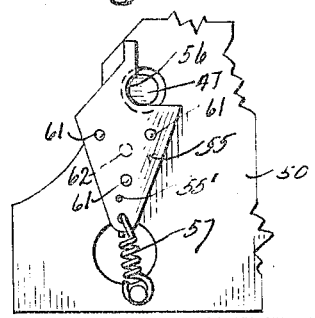

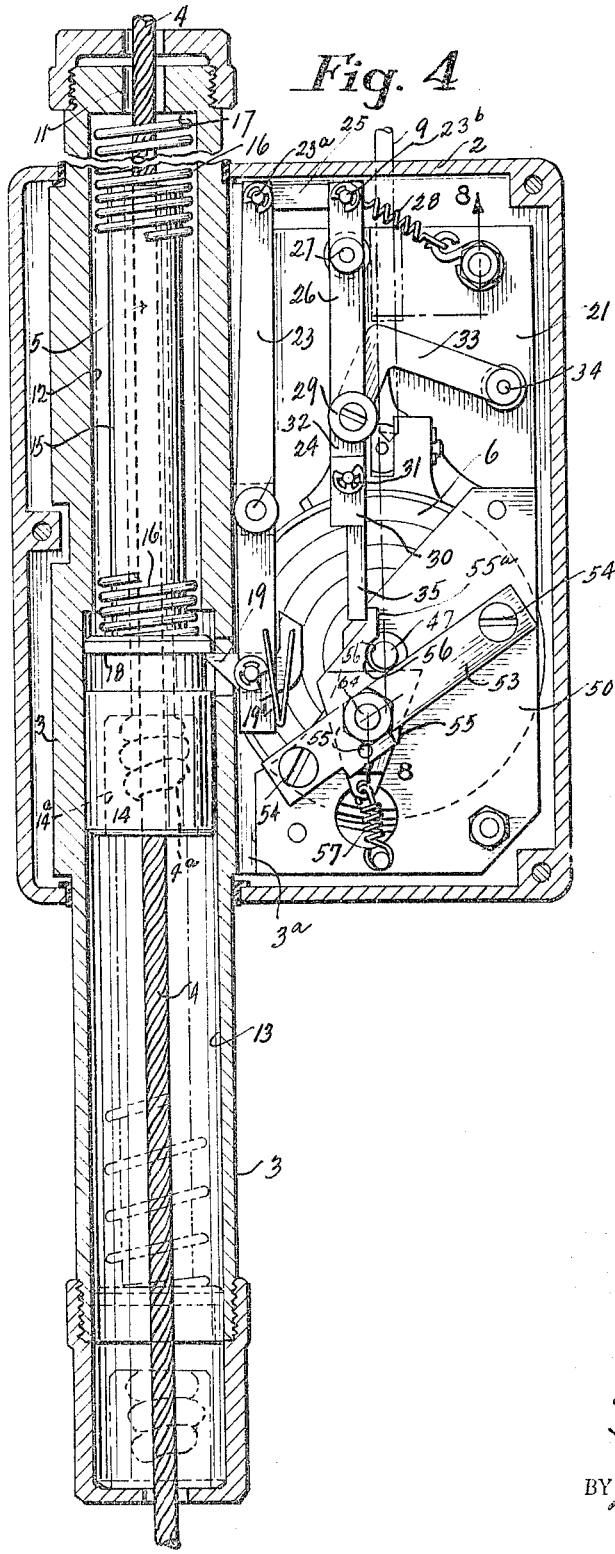
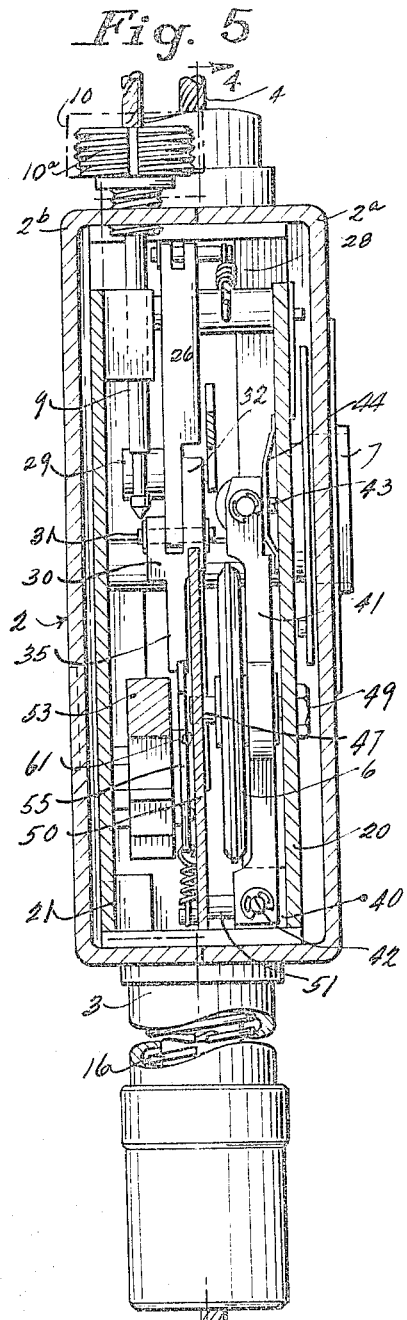
Inventors
Ernest Dennis Kenzie and
John Edward Hatfield.
BY Rommel, Allwine & Rommel
ATTORNEYS

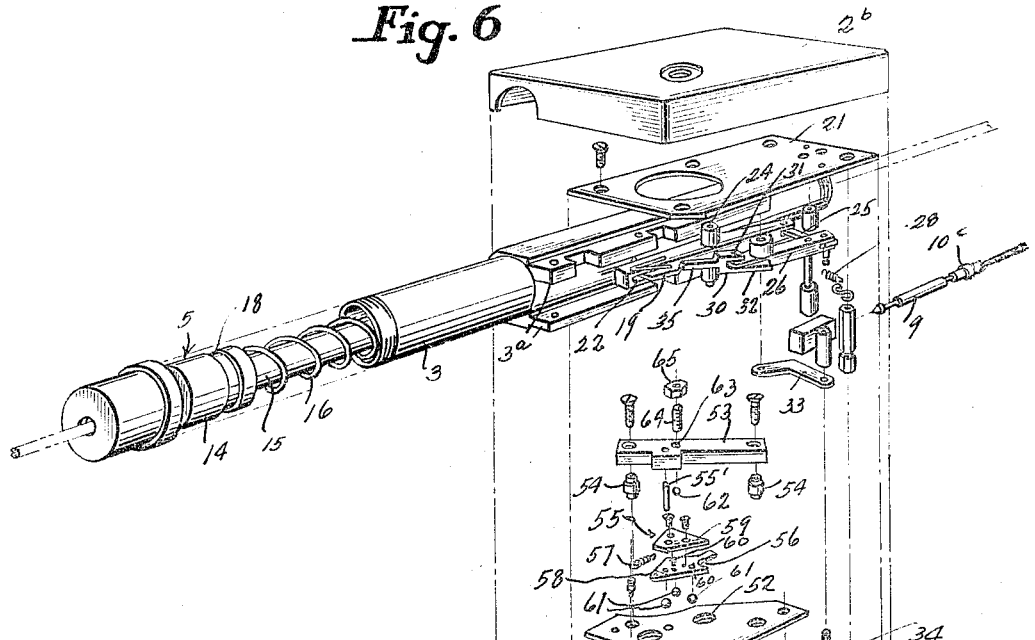

3,291,424
PARACHUTE RELEASE MECHANISM
John Edward Hatfield, Stotfold, and Ernest Dennis Kenzie, Royston, England, assignors to Irving Air Chute Company, Inc., Lexington, Ky., a corporation of New York
Filed Apr. 19, 1965, Ser. No. 449,012
Claims priority, application Great Britain, May 4, 1964, 18,473/64
14 Claims. (Cl. 244—149)

This invention relates to parachute-releasing devices of the kind which rely for their operation on the phenomenon that atmospheric pressure decreases as height increases.

Such devices are known for relatively high altitude operation e.g. many thousands of feet, so that if a parachutist is insensible as he leaves the aircraft the device will release his parachute for him automatically. Some known devices of this kind have means for adjusting the altitude at which the pressure sensitive member will release the device.

It will be understood that for such purposes no very great accuracy is required in predetermining the altitude at which the device will operate. So long as it operates within, say plus or minus one thousand feet of the intended altitude there will be no risk of the parachute not deploying before landing.

Parachute jumping is now increasingly performed as a sport, and one of the pleasures is to enjoy free fall for as long as possible which involves delaying pulling the rip cord until the last possible moment. Inevitably in this there is the danger of failing to pull the rip cord in sufficient time to enable the parachute to deploy.

There are also other occasions, for example, certain military operations, when it is desirable not to deploy a parachute until close to ground contact.

It is an object of the present invention to provide a device for automatically releasing a parachute including a pressure sensitive means such as an aneroid movable in response to changes of atmospheric pressure and arranged to release a mechanism to operate the device, and adjustable means for altering the relative position of the pressure sensitive means and the mechanism, the adjustable means being so calibrated in units of pressure in relation to the movement characteristic of said pressure sensitive means with changing atmospheric pressure that, within the operating range of the device, when said adjustable means is set to the atmospheric pressure prevailing at the intended point of landing the device when descending will operate at a predetermined low or high level above the intended point of landing.

Another object of the invention is a device such as above mentioned which is preferably provided with a master control for disabling the device, so that when set it will not operate for instance at ground level before take off.

To use the device the parachutist at ground level first operates the master control e.g. an arming pin, so that the device cannot operate under any circumstances and then sets the reading of the calibrated adjustable means on the device to correspond to the atmospheric pressure at the intended point of landing. This can be quite easily carried out when jumping for sport as the intended point of landing is usually the airfield from which the parachutists' aircraft takes off.

When the aircraft is above the height at which the device is intended to operate the parachutist can operate the master control e.g. remove the arming pin, so that the device will operate at the predetermined height above the intended point of landing.

The device is also provided with means to allow the parachutist to pull the rip cord by hand, but if he fails to do so before reaching the predetermined height the device will operate to deploy the parachute automatically.

The device includes a spring operated plunger. A catch retains the plunger in position against the force of the spring and releases the plunger in response to movement of the aneroid capsule. A trip lever may bear against the stud of the capsule such that upon sufficient movement of the capsule the trip lever passes over the end of the stud. A lever system preferably connects said catch and said trip lever so that the force exerted on the catch by the spring mounted plunger urges one member of a link system against the trip lever.

The lever system is preferably such that the force on the trip lever is small relative to the force of the spring mounted plunger on the catch.

The accuracy of the device according to the invention intended for low level operation is desirably considerably better than that of known high altitude release devices and to this end the trip lever is preferably mounted in bearings accurately located with respect to the aneroid capsule. Preferably the trip lever is free to move in a plane perpendicular to the direction of movement of the stud of the capsule. Preferably the trip lever is mounted on three ball bearings on a plate rigidly mounted perpendicular to the movement of the stud of the capsule. Preferably a fourth ball bears on the side of the trip lever remote from the other three balls to locate the trip lever positively with respect to the plate. Preferably the trip lever is spring urged to return to a position where it cannot obstruct movement of the stud of the capsule.

In the drawing, wherein for the purpose of illustration is shown a preferred embodiment of the invention and wherein similar reference characters designate corresponding parts throughout the several views:

FIG. 1 shows the parachute-releasing device in front elevation, with part of the outer casing broken away.

FIG. 2 is an enlarged section showing the details of the invention after release.

FIG. 3 is an enlarged section taken on the line 3—3 of FIG. 1.

FIG. 4 is a section taken on the line 4—4 of FIG. 5 with the outer casing removed showing the mechanism before release.

FIG. 5 is a cross sectional view taken on the line 5—5 of FIG. 1.

FIG. 6 is a perspective exploded view of the details of the device with the casing removed.

FIG. 7 is a cross sectional view taken on the line 7—7 of FIG. 2 showing the parts in position after release.

FIG. 8 is a cross sectional view taken on the line 8—8 of FIG. 4, showing the parts in position before release.

FIG. 9 is a fragmentary view of the trip lever in the position of parts shown in the non-release of FIG. 4.

The invention presents some of the features of the ripcord pulling mechanisms shown in U.S. Patents 2,387,350, 2,492,063 and 2,676,655.

The tube 3 has bores of three diameters (FIG. 4); a narrow bore 11 at one end, a wider bore 12 at a central portion, and a yet wider bore 13 at the other end. A plunger 5, having a central bore through which the rip cord 4 passes, is mounted for movement along the passageway of tube 3. The plunger 5 has a cylindrical part 14 corresponding in diameter to the bore 13 and a cylindrical part 15 which fits in a strong coil spring 16 housed in the bore 12. One end of the coil spring 16 abuts against shoulder 17 at the juncture of the bore 11 and bore 12. The other end of the spring 16 bears against the part 14 of the plunger 5 and urges it downwards as seen in FIG. 4.

The part 14 of the plunger 5 has a circumferential groove 18 which is adapted to be engaged by a pawl or detent 19 which holds the plunger 5 in position with the spring 16 compressed.

The part 14 of the plunger 5 has a counterbore 14a of wider diameter than the central bore therethrough. The rip cord 4 has an enlargement or knot 4a which abuts against the shoulder of the counterbore of the plunger 5 so that the rip cord 4 can be pulled downwardly to a limited extent without moving the plunger 5, but any downward movement of the plunger 5 will pull the rip cord 4. Upon release of the pawl or detent 19 the spring 12 will force the plunger downwardly and pull the rip cord to release the parachute canopy.

The release mechanism and aneroid capsule 6 are housed between two frame plates 20, 21 (see FIGS. 3, 5 and 6) which are bolted onto extensions 3a of the tube 3.

The pawl or detent 19 is spring mounted in a slot 22 of lever 23 (see FIG. 2). The lever 23 pivots on pin 24 mounted between plates 20, 21. When the plunger is inserted into the tube 3, the pawl 19 can pivot out of the way to allow entry but will pivot back to engage the groove 18 in the plunger 5, under the influence of a spring 19' connected under tension to lever 23 and pawl 19.

The force in the spring 16 tends to pivot the lever 23 counterclockwise as seen in FIGS. 2 and 4. A link 25 is pivoted to the end of the lever 23 remote from the pawl 19 at 23a, and pivoted to another lever 26 at 23b. The lever 26 pivots about a pin 27 mounted between plates 20, 21. A spiral spring 28 is attached to the pivot point 23b between link 25 and lever 26 urges the pawl 19 into the plunger recess 18 in tube 3. A nylon or synthetic resin stud 29 is mounted on lever 26 to bear against an arming pin 9. Until the arming pin 9 is removed the catch 19 cannot be moved to release the plunger 5. As a safety measure, screw threaded cap 10 may be secured on the screw threaded end of slide bearing 10a, which must be removed to enable disarming of pin 9. The cap 10 holds should 10c against movement. A bifurcated lever 30 is pivoted to the lever 26 by pin 31. One bifurcated leg 32 of the lever 30 is elongated and is pivoted to a bell crank lever 33. The bell crank lever 33 is itself pivoted by pin 34 between the plates 20, 21. The lever 30 has a leg portion 35.

It will be seen that the linkage 23, 25, 26, 30 is such that a very small movement of the pawl 19 will cause a large degree of movement of the leg portion 35. (See FIGS. 2 and 4.)

The mounting of an aneroid capsule 6 will now be described.

A right angled flange 40 is fixed to frame plate 20. A strong lever 41 is pivoted to flange 40 by pin 42. The opposite end of the lever 41 has a bolt 43 pivoted thereto at 43a extending through the plate 20 (see FIGS. 7 and 8). A control knob 7 has an internally threaded bushing 44a which is threaded onto the bolt 43. By rotating the knob 7 the lever 41 is pivoted about the pin 42. A disc spring 44 normally urges the lever 41 in counterclockwise direction on its pivot 42 as seen in FIG. 5 and takes up any backlash into the screw thread 43.

An internally threaded bushing 45 is mounted in an aperture 46 in the lever 41 and constitutes the mounting means for the aneroid capsule 6. The capsule has a stud 47 projecting from one face and a screw stem 48 projecting from the other face. The screw stem 48 screws through the bushing 45 and is secured in position by a nut 49. The capsule 6 is thus firmly but adjustably located on the lever 41, which is adjustably located between the plates 20, 21 by rotating to knob 7.

On the side of the capsule 6 away from the plate 20 is located a hardened steel plate 50 secured to and spaced from the plate 20 by three members 51. The plate 50 has an aperture 52 through which the stud 47 of the aneroid 6 may extend depending on the setting of the knob 7 and the ambient atmospheric pressure. Mounted on the plate 50 is a heavy bar 53 spaced therefrom by two spacer sleeves 54. Pivotally mounted by means of pivot pin 55' between the plate 50 and the bar 53 is a trip lever 55. The trip lever 55 has a semicircular recess 56 which can bear against the stud 47 of the capsule 6. The trip lever 55 has a spring 57 so that it is self-centering and in its neutral position does not obstruct movement of the stud 47 of the capsule 6.

The trip lever 55 is formed of two plates 58, 59 of hardened steel. One plate 58 is provided with three circular apertures 60 and the other plate 59 is bolted onto plate 58 and closes the apertures. Three ball bearings 61 are seated in the apertures 60 and bear on the plate 50. A fourth ball bearing 62 is seated in a bore 63 in the bar 53 and is urged by a screw 64 onto the side of the plate 59 remote from the other balls 61. A lock nut 65 locks the screw 64. The fourth ball bearing 62 bears in a direction through the middle of the triangle formed by the three balls 61.

The trip lever 55 is thus positively located a fixed distance from the plate 50.

When the plunger 5 is held against the compressed spring 16 by the pawl 19, and when the arming pin 9 is withdrawn the leg portion 35 of lever 30 will bear against the extended end 55a of trip lever 55. If the stud 47 of the capsule 6 projects a sufficient distance through the plate 50 the semi-circular recess 56 of the trip lever 55 will bear against the stub.

It will be understood that because of the lever mechanism, above described, a force on the pawl 19 will cause a relatively very small force on the stud 47 in the unarmed position. As the atmospheric pressure increases, the stud 47 will withdraw to the right as seen in FIG. 2 until it reaches a position where the trip lever 55 can pass over the stud under the action of the leg portion 35 of lever 30. The lever 30 will then pivot to the position shown in FIG. 2 so that the pawl 19 no longer restrains the plunger 5. Under the action of the spring the plunger 5 will now pull the rip cord 4.

After release of the plunger 5 by the pawl 19 thus permitting the rip cord to be pulled, the spring 28 returns the levers 23, 25, 26, 30 as shown in the release position in FIG. 2 to the reset position shown in FIG. 4. The trip lever 55 is also centered into its reset position by the spring 57. It will be understood that the arm 35 of the lever 30 will, during its resetting motion, have to pivot the trip lever 55 in a counterclockwise direction as shown in FIG. 2, until it is able to pass the trip lever 55 to take up its reset position as shown in FIG. 4.

The location of the trip lever 55 with respect to the end of the stud 47 of the capsule 6 is extremely accurate. A movement of 0.0001 inch in the relative location of stud and trip lever will effect the height at which the device will operate by approximately 50 feet. It will be understood that these figures depend on the size and design of the capsule used.

To summarize, there are four distinct parts of the device:

(a) The spring urged plunger 5,
(b) The lever mechanism 23, 25, 26, and 30,
(c) The trip lever 55 located relative to the apertured plate 50, and (d) the adjustable aneroid capsule 6.

The lever mechanism insures that the force of the spring 16 on plunger 5 exerts only a very small force on the stud of the aneroid capsule thus reducing friction to a minimum. The bearings between the trip lever 55 and plate 50 insures that lever 55 and plate 50 are accurately located relative to each other. The strong lever 41 on which the capsule 6 is mounted is spring urged so that there is no backlash as the knob is adjusted.

The scale 8 calibrated in millibars in relation to the displacement characteristic of the aneroid capsule 6 with changing atmospheric pressure so that within the operative range of the device, the setting of the scale to the prevailing atmospheric pressure at the landing zone will result in the device operating to release a parachute connected therewith at a fixed height of 1500 feet above the landing zone. Other embodiments of the invention may be designed to operate at other heights above the landing zone, for example, at 2000 or 3000 feet. A suitable range of adjustment for the scale 8 for landing zones up to an altitude of 3000 feet is from 890–1030 millibars.

The device can be mounted at a convenient position on the parachute harness and when set will serve as a safety device to pull the rip cord if the parachutist should fail to do so.

It has been found in tests with embodiments of the invention described above that an accuracy of within 100 feet of the intended height of 1500 feet can be expected.

There has thus been described an automatic parachute release device for use at relatively low heights which is particularly suitable for use by parachutists jumping for pleasure or other purposes.

Various changes in the size, shape and arrangement of parts may be made to the form of invention herein shown and described without departing from the spirit of the invention and scope of the claims.

We claim:

1. In a parachute release mechanism the combination of a frame and casing structure, a rip cord mounted on the frame and casing structure, a plunger movably carried in the frame and casing structure having means to connect the rip cord thereto, spring means in the frame and casing structure normally urging the plunger into rip cord pulling position, lever means mounted upon the frame and casing structure, a pawl movably carried by the lever means having means to releasably connect with said plunger to hold the plunger spring means biased, a barometric motor mounted on said frame and casing structure having a detent on the atmospheric affected portion thereof, a trip lever movably mounted on said frame and casing structure positioned to releasably engage the detent of the barometric motor, means biasing the trip lever to normally position it in a neutral position with respect to the barometric motor detent, said trip lever when in neutral position holding the lever means attached to said pawl inoperative to release the pawl from its plunger holding position until the barometric motor detent is moved by the atmospheric pressure action of the barometric motor out of the path of movement of the trip lever.

2. A parachute release mechanism as described in claim 1 in which releasable arming means is mounted on the frame and casing structure to normally hold the lever means inoperative to release the pawl from its restraint of the spring biased plunger.

3. The parachute release mechanism described in claim 1 in which the connection of the rip cord with the frame and casing structure is such as to permit manual operative pulling of the rip cord independent of plunger actuation of the rip cord.

4. In a parachute release mechanism the combination of a frame and casing structure, a rip cord mounted on the frame and casing structure, a plunger movably carried in the frame and casing structure having means to connect the rip cord thereto, spring means normally urging the plunger into rip cord pulling position, a barometric motor mounted on the frame and casing structure, a trip lever movably mounted on the frame and casing structure having means normally urging it to a neutral position, said barometric motor having a portion movable by atmospheric pressure which is normally positioned to hold said trip lever inoperative until atmospheric pressure reaches a predetermined amount, means to vary the setting of the barometric motor, pawl means, lever means mounting the pawl means on the frame and casing structure to restrain the spring means of the plunger, and means movably connected to said lever means releasably engaging the trip lever whereby to maintain the pawl means in operative position so long as said barometric motor atmospheric pressure affected portion is in position to obstruct movement of the trip lever.

5. A parachute release mechanism as described in claim 4 in which releasable arming means is mounted on the frame and casing structure normally holding the lever means in position to maintain the pawl in plunger spring restraining relation.

6. The parachute release mechanism as described in claim 1 in which the lever means is of such construction that the force of the plunger spring exerts a comparatively very minute force of the trip lever against said detent of the barometric motor when the said detent is in position to obstruct movement of the trip lever.

7. In a parachute release mechanism the combination of a frame and casing structure, a rip cord mounted upon the frame and casing structure, a plunger movably carried on the frame and casing structure having means to connect the rip cord thereto, spring means on the frame and casing structure normally urging the plunger into rip cord pulling position, a lever pivotally mounted intermediate its ends on the frame and casing structure, a pawl movably mounted on said lever spaced from its pivot in position to releasably restrain movement of the plunger, pawl resetting spring means connected to the pawl and lever, a second lever pivoted on the frame and casing structure intermediate its ends, a link pivotally connecting the end of the first mentioned lever remote from said pawl and the end of the second mentioned lever adjacent thereto, a third lever pivotally connected to the second lever at the opposite side of the pivot of the second lever with respect to said link, a bell crank lever pivoted to said frame and casing structure and to the second mentioned lever at a location adjacent to the pivot of the third lever upon said second lever, a trip lever movably mounted on said frame and casing structure, a barometric motor mounted on said frame and casing structure including an atmospheric pressure affected detent, spring means connected to the frame and casing structure normally causing the trip lever to assume a neutral position with respect to the detent of the barometric motor, said detent being in position to obstruct movement of the trip lever to a release position so long as the barometric motor is operating in atmospheric pressure sufficient to maintain the detent in such position, said trip lever having a portion thereof engageable with the third lever above mentioned to hold said second and third levers against the bias of the plunger spring, said trip lever when the detent of the barometric motor is removed from obstructing relation thereof moving under a small force from the third lever to enable the first lever to release the pawl from restraint of its plunger.

8. A parachute release mechanism as described in claim 7 in which spring means is provided for resetting the position of the first, second and third levers in order that the pawl may assume its plunger holding position.

9. A parachute release mechanism as described in claim 7 in which arming means is movably mounted upon said frame and casing structure acting upon the second lever between its ends to normally hold the levers in inoperative positions.

10. In a parachute release mechanism barometric motor mounting the combination of a frame and casing structure, a lever pivotally mounted on said frame and casing structure, a barometric motor adjustably mounted on said lever intermediate the lever ends having at the pressure sensitive side thereof a detent, means on the frame and casing structure to adjust the angle of said lever on its pivot and the resultant position of said motor detent, a trip lever movably mounted on said frame and casing structure having a portion thereof in position to releasably engage the detent of said barometric motor detent, and expansion spring actuated centering means normally holding said trip lever in a neutral position.

11. In a barometric release mechanism for releasing parachutes at low ground heights, the combination of a frame structure, a parachute rip cord mounted upon the frame structure, force urged plunger means mounted on said frame structure having a connection with parachute rip cord for operating the same, a barometric motor mounted on the frame having a detent portion, a trip lever movably mounted on the frame, a pawl, and lever means movably mounted on said frame supporting said pawl to releasably hold said plunger force inoperative, said lever means including a movable portion normally obstructed by said trip lever but releasable therefrom at a time when the detent of the barometric motor is out of obstructing relation to release movement of said trip lever, said lever means being so constructed and arranged that the force urged on the plunger against said pawl is powerful and the transmission of said force against said trip lever is comparatively minute.

12. The release mechanism described in claim 11 in which means is provided normally urging the trip lever to a neutral status with respect to the detent of said barometric motor.

13. The release mechanism described in claim 1 in which spring resetting means normally urges the pawl into plunger restraining position.

14. The barometric motor mounting as described in claim 10 in which the trip lever is mounted by anti-friction bearings to insure a correct planar movement.

References Cited by the Examiner
UNITED STATES PATENTS

| | | | |
|---|---|---|---|
| 2,353,440 | 7/1944 | Bresee | 244—150 |
| 2,584,164 | 2/1952 | Stallan | 244—150 |
| 2,676,655 | 4/1954 | Hatfield | 244—150 X |
| 3,013,834 | 12/1961 | Minicucci | 244—150 X |

MILTON BUCHLER, *Primary Examiner.*

ALFRED E. CORRIGAN, *Examiner.*